ANALOG-DIGITAL INTEGRATOR AND RECORDER FOR ANALYSIS

Filed Dec. 14, 1964 6 Sheets-Sheet 1

David W. Spence
Clinton D. Frisby
INVENTORS

BY Hayden & Pravel

ATTORNEYS

ANALOG-DIGITAL INTEGRATOR AND RECORDER FOR ANALYSIS

David W. Spence
Clinton D. Frisby
INVENTORS

BY Hayden & Pravel
ATTORNEYS

David W. Spence
Clinton D. Frisby
INVENTORS

BY Hayden & Pravel

ATTORNEYS

ANALOG-DIGITAL INTEGRATOR AND RECORDER FOR ANALYSIS

Filed Dec. 14, 1964

David W. Spence
Clinton D. Frisby
INVENTORS

BY Hayden & Pravel

ATTORNEYS

David W. Spence
Clinton D. Frisby
INVENTORS
BY Hayden & Pravel
ATTORNEYS

ANALOG-DIGITAL INTEGRATOR AND RECORDER FOR ANALYSIS

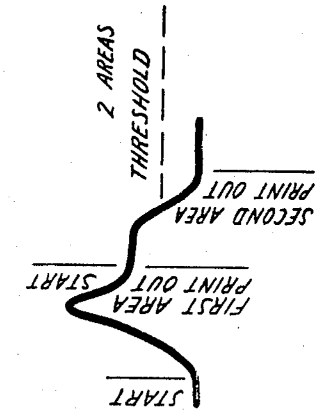

THRESHOLD LEVEL DETECTOR "ON"

Fig. 13

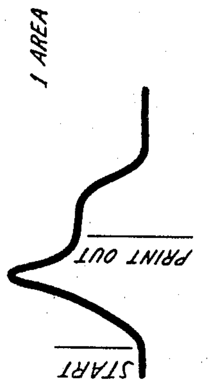

THRESHOLD LEVEL DETECTOR "OFF"

Fig. 14

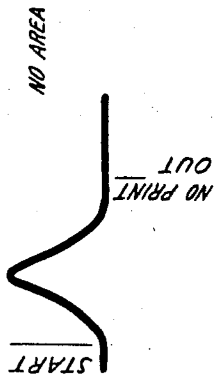

PEAK TIME BELOW MINIMUM SET ON PEAK TIMER

Fig. 15

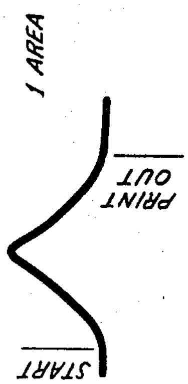

PEAK WIDTH EXCEDES MINIMUM SET ON PEAK WIDTH TIMER

Fig. 16

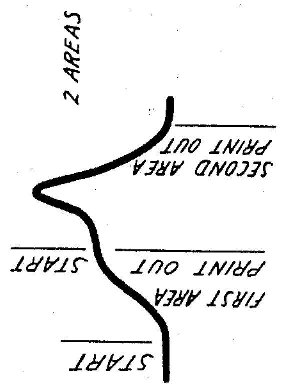

POSITIVE REENTRY "ON"

Fig. 9

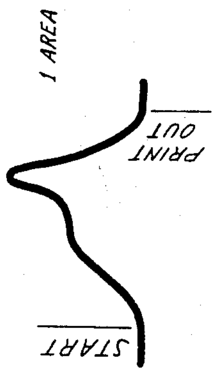

POSITIVE REENTRY "OFF"

Fig. 10

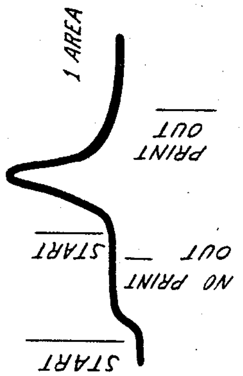

PLATEAU TIMER "ON"

Fig. 11

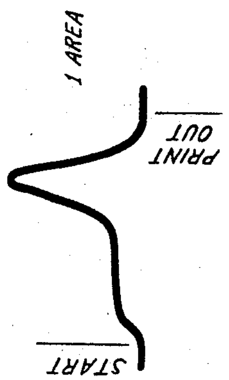

PLATEAU TIMER "OFF"

Fig. 12

David W. Spence
Clinton D. Frisby
INVENTORS

BY Hayden & Pravel
ATTORNEYS

United States Patent Office

3,412,241
Patented Nov. 19, 1968

3,412,241
ANALOG-DIGITAL INTEGRATOR AND RECORDER FOR ANALYSIS

David W. Spence and Clinton D. Frisby, Houston, Tex., assignors to Infotronics Corp., a corporation of Texas
Filed Dec. 14, 1964, Ser. No. 418,064
27 Claims. (Cl. 235—183)

ABSTRACT OF THE DISCLOSURE

An automatic system for digital integration of analog signals wherein the amplitude of the analog signal is nonlinearly related to its encoded information. A log converter is used to linearize the analog signal and a voltage to frequency converter digitizes the linearized analog signal by producing a frequency modulated signal consisting of a pulse train having an instantaneous frequency which is proportional to the amplitude of the linearized analog signal. The pulses are counted according to the direction of logic circuits which detect, identify, and separate valid peaks by correlating various combinations of waveform slope, slope sequence, amplitudes, and timing. The base line value of the analog signal is automatically corrected during the absence of a valid signal excursion in the analog signal which is indicated by the logic circuitry. The valid accumulations of the counter are temporarily stored in a memory and are thereafter recorded in a permanent form.

This invention relates to an electronic circuit which integrates the area under a voltage or current wave form peak to obtain the area under the wave form peak of another signal nonlinearly related thereto. The invention also separates various wave form shapes into separate peaks to record the total area under each peak.

Chemical analysis of an unknown or sample comprised of a plurality of constituent compounds is frequently achieved by means of gas chromatographic detectors which form a fluctuating output voltage which is recorded and indicates the occurrence of particular constituents by means of peaks in the recorded wave form. The area under each particular peak is proportionately related to the constitutent in the unknown so that the ratio of the area under a given peak to the total area under all the peaks for the sample provides the percent of the constituent in the sample. It is common for a sample having many constituents to be represented by many peaks which may run together, be superimposed on one another, or otherwise depart from the more easily handled Gaussian peak shape.

Gas chromatographs are limited in their application to certain types of unknowns while more sophisticated apparatus is required for the analysis of unknowns having constituents which are generally denoted as amino acids.

Chemicals from the human body and those generated by other biological systems often include a plurality of amino acids which chemicals require analysis of the same character to obtain both the nature of the unknown constituents and the percentage which each constituent represents of the unknown. To the extent that amino acid analysers provide this data, such analysers are similar to the gas chromatographs. However, a marked difference exists in the operation of the analysers with respect to gas chromatographs which materially affects the output information.

Gas chromatographs supply wave forms which are linearly related to the flow of unknown constituents past the sensor so that a direct proportionality exists between the sensor output voltage or current wave form and the unknown. Thus, it is possible to obtain a direct, proportional relationship between the area under each peak of the sensor wave form and the constituents comprising the unknown. On the other hand, amino acid analysers provide an output voltage which is nonlinearly related to the quantity or percent of unknown constituents in the sample. As an example, an amino acid analyser, model 120B manufactured by the Spinco Division of Beckman Instruments, Inc., is an ion-exchange chromatograph which indicates the occurrence of an unidentified amino acid by supplying an output voltage related to the optical density of the unknown. The device uses a lamp at one end of a fluid column known as a cuvette through which the unknown moves and a photocell at the other end of the column which supplies an output voltage dependent on the absorbance of light by the column of fluid. Without going into further details, it is sufficient to state that the analytical wave form provided by this amino acid analyser is exponentially related to the quantity of unknown amino acid passing between the photocell and the light source.

Considerable interpretation has been required of recorded wave forms derived from amino acid analysers. Such wave forms are customarily recorded on a strip chart which is exponentially scaled to provide measurements proportionate to the stimulus (the unknown amino acid) acting nonlinearly on the sensor (photocell) in the analyser. The model 120B analyser provides three output signals, one of which is the optical density at 440 millimicrons, and the other two output signals are readings taken at different cuvette lengths with light having a wave length of 570 millimicrons. The device is capable of making a dot every few seconds (e.g., every two seconds) and cycles through the three output voltages so that the strip chart has recorded thereon three wave forms. Any one of the three output signals may be considered separate and apart from the others to provide the analytical information concerning the unknown sample but the information is obtained only after applying one of many data reduction techniques to the wave form.

A typical sample having a number of unknown amino acids may require analysis over a twenty-four hour period. This means that a given waveform to be quantitized will have 14,400 individual dots formed on the special logarithmic paper after operation of the analyser for twenty-four hours. The values represented by dots which are located above the base line level in defining a peak are totaled by reading the value from the logarithmic scale extending along the ordinate of the paper. The magnitude of this task is considerable since perhaps as much as twenty-five percent of the curve is above the base line to define peaks indicating unidentified amino acids, so that the reading of the ordinate value of several thousand dots making up the plurality of peaks identifying the unknown amino acids is extremely time consuming. Also, the technique of obtaining the value of each dot is error-prone in some regions on the logarithmic paper because the compression of linear values yields large errors of actual value for small errors in reading data placed on compressed portions of the logarithmic paper. Essentially, this system resembles integration by the delta method in obtaining rectangular approximations of relatively small width after conversion through use of the logarithmic scale on the paper.

A second technique of obtaining the area under a peak requires the reading of the peak value on the log scale and determining the peak width at the half amplitude points. The peak height is multiplied by the peak width by counting the number of dots between the half-value points to obtain an approximation based on the assumption that the peak has a standard shape. This assumption is clearly optimistic since many of the curves are not Gaussian in shape and, of course, this assumption is quite erroneous when two peaks are so close together that they run together.

Wave form shapes can be irregular in any chromatographic analysis and this is particularly true because the small output voltages of chromatographic sensors are masked by voltage drift in the apparatus and other spurious signals. It is not uncommon to have plateaus beneath peaks or adjoining the forward or trailing voltage fluctuations making up a peak. Voltage drift and other spurious signals give rise to misleading information and additionally make data reduction quite difficult upon presenting adjacent or ill-defined peaks. Thus, it will be appreciated that considerable efforts were heretofore required in reducing data from analysers.

An object of this invention is to provide a new and improved circuit which integrates the area under a wave form having a nonlinear relationship to the units of measure.

A further object of this invention is to provide a new and improved peak recording and integrating circuit which separates peaks confusingly run together.

One object of this invention is to provide a new and improved circuit which automatically correlates amino acid analysis data to constituents in the sample inculding the unknown constituents and provides the percent content of each acid in the unknown.

Still another object of this invention is to provide a new and improved amino acid analyser circuit which eliminates the data reduction problem required in reducing data accumulated after up to twenty-four hours operation which produces up to 14,400 data points.

An additional object of this invention is to provide a new and improved device detecting slope variations indicative of onset of a peak extending from a base line on the order of one microvolt per second.

An equally important object of this invention is to provide a new and improved circuit for integrating wave forms having slope which is sequentially zero, positive, zero, negative, and zero.

Also, another object of this invention is to provide a new and improved circuit for integrating wave forms having plateaus and other departures from Gaussian wave form.

A particularly important object of this invention is to provide a new and improved integrating circuit for the output wave form of nonlinear transducers or sources which integrates the output wave form while obtaining a summation in linear units of the stumulus or other variable acting on the nonlinear transducer or source.

Still another object of this invention is to provide a new and improved analog to digital converter giving a serial pulsed output which is totalled.

One further object of this invention is to provide a new and improved integrating circuit which can operate on wave forms having peaks in the millivolt range and extending for hours as commonly occurs in the analysis of amino acid samples which require up to twenty-four hours analysis or more.

An additional object of this invention is to provide a new and improved integrating circuit which follows a base line from which the drift is removed to be able to respond to voltage peaks of gradual slope and very small amplitude above the base line.

Still another object of this invention is to provide a new and improved integrating circuit which yields printed digital output data or which is compatible with punch card machines, magnetic tape recorders, paper tape punches or other data recording devices.

Yet another object of this invention is to provide a new and improved integrating circuit for measuring the area under a curve which area measurement is immediately removed from a counter to permit the counter to begin immediately integrating a closely following peak.

An equally important object of this invention is to provide a new and improved integrating device which buffers count totals in allowing read out equipment to accept each digit of the count total.

One object of this invention is to provide a new and improved integrator for use with an amino acid analyser having a logarithmic non-linearity in its output signal.

A particularly important object of this invention is to provide a new and improved integrator for use with amino acid analysers having a logarithmic converter to provide a signal which integrates to provide linear units for the total.

Another object of this invention is to provide a new and improved integrating device for use with sources providing nonlinear representations of stimuli acting on the source which integrator has means therewith for removing the nonlinearities of the source output signal.

One important object of this invention is to provide a new and improved integrator for providing the total area of individual peaks in a wave form which accurately detects the onset of the peaks of expanding voltage fluctuations near the base line value to detect accurately the beginning of peaks.

Other objects and advantages of the present invention will become more readily apparent from an examination of the following specification and drawings wherein:

FIG. 9 illustrates a typical voltage wave form peak and the effect thereon of positive re-entry means provided with the invention to the curve;

FIG. 10 illustrates the same curve of FIG. 9 for contrast with the positive re-entry means inoperative;

FIG. 11 illustrates a typical curve and the effect thereon of plateau timer means provided with the invention to the curve;

FIG. 12 illustrates the same curve of FIG. 11 for contrast with the plateau timer means inoperative;

FIGS. 13 and 14 illustrate similar curves and the effect thereon of threshold level detecting means to the curves; and FIGS. 15 and 16 illustrate additional similar curves and the effect thereon of minimum peak width means provided with the invention.

Figure 1:
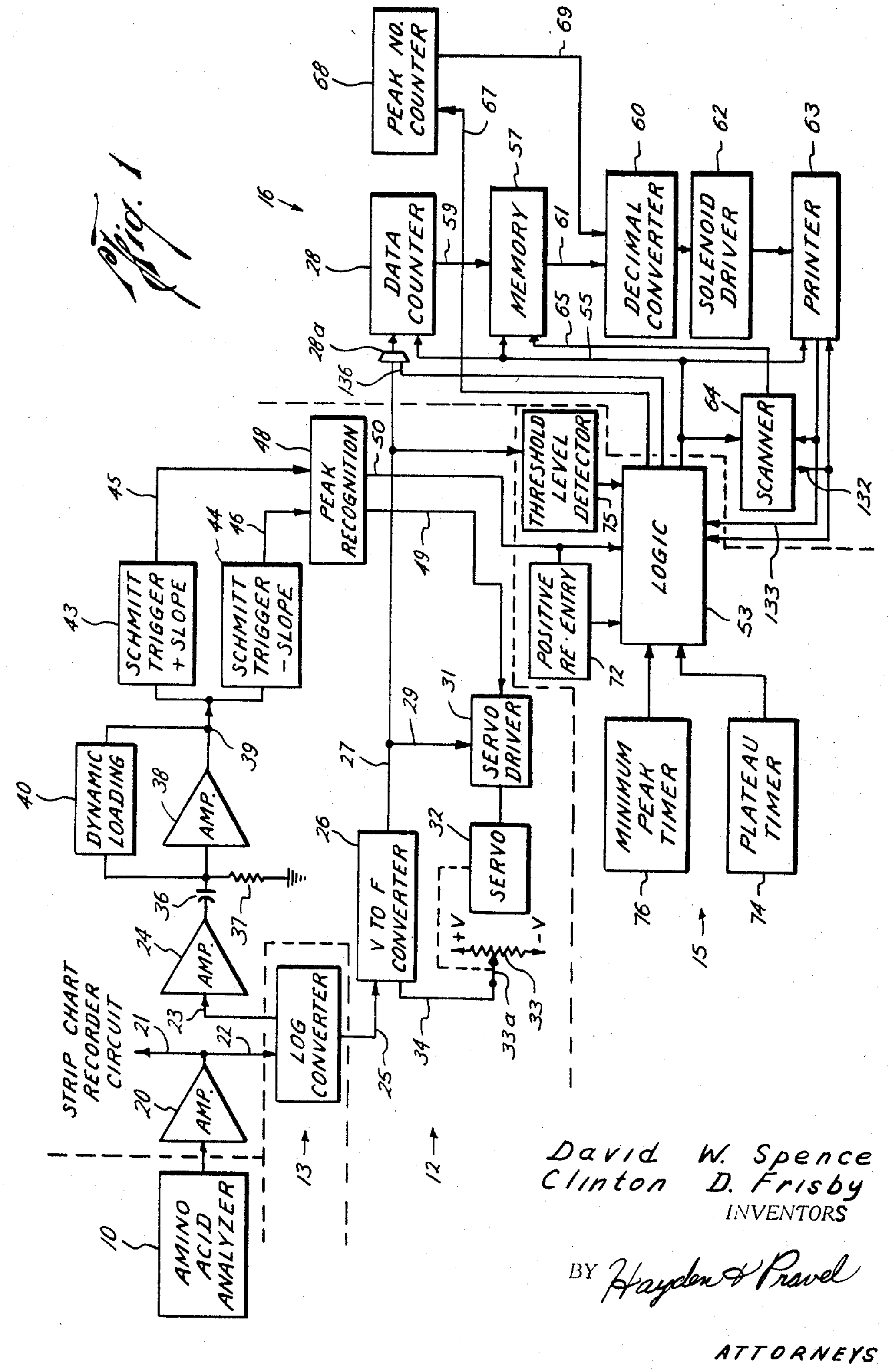
FIG. 1 is a schematic block diagram of the integrating device of this invention.

Briefly, FIG. 1 illustrates an amino acid analyser 10 which is connected to an automatic base line drift correction circuit indicated generally at 12 within the dotted lines of FIG. 1 and which is described in copending application Ser. No. 361,970, now issued as United States Letters Patent No. 3,359,410. A logarithmic converter indicated generally at 13 receives an amplified input signal and provides two output voltages which are related to the input voltage in accordance with the graph shown in FIG. 3. A voltage to frequency converter 26 generates a pulse train with each pulse related to an equal increment of area under the logarithmically corrected peak and the pulses are accumulated in the data handling equipment indicated generally at 16 which is controlled by logic control means indicated generally at 15. As described in the copending patent application, a base line drift circuit 12 maintains a base line between peaks which is drift free so that the peaks are well defined relative to the base line. Peak sensor means represented by the CR differentiating circuit elements 36 and 37, the dynamic loading circuit 40, the amplifier 38, the Schmitt triggers 43 and 44, and the peak recognition circuit 48 and the logic control means 15 control the data handling means 16 to obtain the total area of all of a sequence of peaks in a wave form and transfer the data for each peak for presentation to output equipment on completion of each peak.

Considering the invention in more detail, the amino acid analyser 10, such as the above mentioned model 120B manufactured by Spinco Division of Beckman Instruments, Inc., provides an output signal to a preamplifier 20 which signal is amplified and applied to a conductor 21 for connection to a strip chart recorder or other such device. A conductor 22 communicates with the converter 13 and supplies input voltage at an amplified level from the amplifier 20. The amino acid analyser 10, which passes effluent in front of a photocell to absorb light impinging on the photocell, has a photocell output voltage which is reduced as the light absorbance by amino acid (not shown) in the beam of light from the light source increases. The base line value indicative of no amino acid in the sample passing between the light cell and the photocell is therefore a high voltage, relatively speaking, and peaks representing the occurrence of unknown constituents in the effluent are lower voltages departing from the base line value. The log converter 13, as will be explained, inverts or provides a reciprocal voltage related to the input voltage from the amplifier 20 which voltage is supplied to a conductor 23 and which is input to an amplifier 24. The log converter 13 also provides an output voltage which removes the logarithmic nonlinearity from the input signal from the amino acid analyser 10 which generated voltage is supplied to a conductor 25 and connected to a voltage frequency converter 26.

While operation of the automatic base line drift corrector circuitry 12 is described in more detail in copending patent application Ser. No. 361,970, now issued as United States Letters Patent No. 3,359,410, the various circuits represented in block schematic form and included in the base line drift corrector 12 are described to relate their operation to the operation of the invention. The V-to-F converter 26 receives the signal on the conductor 25 which is a voltage proportional to and linearly related to the stimulus (the effluent) acting on the sensor (the photocell) and provides a pulse train output with each pulse representing an equal increment of area under the curve or peaks of the wave form describing the stimulus acting on the sensor. The device 26, which in its preferred form is as purchased from Vidar Corporation and designated model 211B, accumulates charge on a capacitor at a rate proportional to the input voltage. As the charge on the capacitor increases to a predetermined level, a precisely measured charge is removed from the capacitor and used to trigger a pulse generating circuit. Unit charges are removed from the capacitor as fast as the capacitor accumulates charge with each unit charge representing an equal increment of area under the peak of the input voltage. The total charge removed from the capacitor is the integral of the instantaneous current wave form with respect to time. The output pulses from the converter 26 are conducted by a wire 27 to a data counter 28 and a total is obtained which represents the area under a particular peak. Operation of the data counter 28 will become more apparent when described in greater detail hereinafter.

During the occurrence of a base line value output signal from the amino acid analyser 10, the pulse rate of the converter 26 is quite slow but is subject to variations due to base line drift. During the base line drift the pulses from the converter 26 are conducted by a wire 29 to a servo driver 31 which triggers off the pulses to operate a servo 32. The servo 32 is mechanically connected to a variable resistor 33 and drives its wiper arm 33a to obtain a feedback voltage for the conductor 34. The conductor 34 connects to the input of the V-to-F converter 26 and provides a feedback voltage which co-operates with the input voltage from the conductor 25 to maintain the base line value of the amino acid analyser output signal. In the preferred embodiment, the negative feedback signal provided by the servo loop removes drift from the current wave form being integrated by the capacitor of the converter 26 to obtain an essentially constant output in the conductor 27 of about three or four pulses per second during base line conditions.

The servo loop including the servo driver 31 and the servo 32 removes drift from the base line but it will be appreciated that it is necessary for the servo driver 31 to be defeated during the occurrence of a peak value departing from the base line to avoid cancellation of information.

The amplifier 24 amplifies the inverted signal from the converter 13 and applies it to one side of a capacitor 36 having its opposite side connected to ground through a resistor 37 to comprise an electronic differentiating circuit. The output of the amplifier 24 is differentiated to obtain the slope of the signal with positive slope denoted by a positive voltage at the common junction between the capacitor 36 and resistor 37 and negative slope being indicated by a negative voltage. An amplifier 38 is connected to both capacitor 36 and the resistor 37 and amplifies the slope indicating voltage and provides an output to a point 39 which is connected to a dynamic loading means 40 communicating with the differentiating circuit. The dynamic loading means (the resistance of a diode conducting in the forward direction) and the amplifier 38 co-operate with the resistor 37 to dynamically load the capacitor 36 to improve speed of response of the differentiating means. The slope detecting means needs only to detect the onset or termination of both positive and negative slope for indicating the occurrence of a peak in the signal supplied by the amino acid analyser 10 while the extent of the slope is relatively immaterial in this portion of apparatus and is lost by operation of the dynamic loading means 40.

The point 39 thus provides a quiescent voltage value indicative of zero slope or a horizontal line function in the output of the analyser 10, or it provides high and low voltage levels indicative of positive or negative slope. A pair of Schmitt triggers 43 and 44 is connected to the point 39 with Schmitt trigger 43 providing an output level to a conductor 45 when the voltage at the point 39 deflects upwardly indicating positive slope of the voltage wave form differentiated by the capacitor 36 and resistor 37. On the other hand, the Schmitt trigger 43 but it provides an output voltage level in the conductor 46 which indicates that the differentiating means including capacitor 36 have detected negative slope in the analytical wave form. Both the conductors 45 and 46 are connected to a peak recognition circuit 48 which operates in response to both signals to provide an output signal indicating the presence or absence of a peak in the wave form.

The peak recognition circuit 48 is a logical circuit including five NOR gates which forms an output, a servo inhibit signal, supplied by a conductor 49 as an input for the servo driver 31 to withhold operation of the servo driver 31 during the occurrence of a peak. The servo inhibit signal stops operation of the servo 32 to prevent the servo 32 from injecting a feedback signal into the V-to-F converter 26 which would completely cancel out the peak of the wave form. Operation of the servo 32 is withheld for the duration of the peak wave form so that the analytical information will not be cancelled out.

The peak recognition circuit 48 also supplies an output through a conductor 50 connected to the logic control means indicated generally at 15 for relating operation of the data handling means 16 to the occurrence of a peak. When a peak does occur, the count enable signal carried by the conductor 50 is connected to control circuit 53 which operates in the following manner. The data counter 28 in the data handling means 16, having been cleared, to contain a total count of zero, is switched on as soon as peak recognition means 48 recognizes the onset of a peak and operates through the logic 53 which applies an output voltage through a conductor 136 for enabling the data counter 28 by operation of an input gate 28*a*. Simultaneously, the servo inhibit signal on the conductor 49 stops operation of the servo driver 31 and the servo 32 to remove the feedback voltage in the conductor 34 so that the V-to-F converter 26 is freed to operate over its full dynamic range to supply pulses to the data counter 28 where each pulse input to the data counter 28 represents an equal increment of area under the peak wave form input to the converter 26. The data counter 28 accumulates the pulses so long as the peak recognition means 48 maintains a count enable signal over the conductor 50 to the logic circuitry 53. When the peak recognition means 48 recognizes the return of zero slope at the base line level, it operates to remove the count enable signal from the logic circuitry 53 which thereby stops operation of the data counter 28 to hold whatever count total has been accumulated during the passage of the peak.

The conductor means 55 carries signals which transfer the count in the data counter 28 to buffer memory 57 (which was previously cleared) on termination of counting by the data counter 28 through a conductor 59. The means 55 applies a signal to the counter 28 to clear it and place it in condition for counting from zero for an immediately following peak so that counting can continue while printing the area of a previous peak. The buffer memory 57 transfers the data which is preferably in binary coded decimal form to a BCD decimal converter 60 through a conductor means 61. The converter 60 presents the data in decimal form to a solenoid driver 62 which operates a printer 63 having solenoids mounted to punch the conventional ten keys to print the total area provided from the data counter 28 on a strip of paper tape.

It should be recognized that the data counter 28 preferably accumulates data represented by a plurality of decades to provide a peak area of up to one million units. Co-operating with a six decade counter 28, the memory 57 has a like number of decades for storing theinformation in binary coded decimal format. The printer 63, which receives one digit at a time, is fed information from the memory 57 by operation of a scanner 64 which provides output signals on a conductor means 65 for transferring a digit from each decade in the memory 57. The scanner 64 sends sequenced pulses to the memory 57 which transfer the digits (in BCD) in the memory 57 to the solenoid drivers 62 in order from the most significant digit to the digit representing units. Each one of the digits is received in sequence by the solenoid driver 62 which operates the appropriate solenoid to punch one of the ten keys on the printer 63. By this means, a multidigit number of any length is transferred from the data counter 28 to the printer 63.

A conductor 67 is connected to the logic circuitry 53 and extends to a peak number counter 68 which assigns an identification number to each of the peaks occurring in the wave form and having an area totaled by the data counter 28. This device may be a single decade counter which operates off a signal akin to the output of the peak recognition circuit 48 to count each peak without regard for its size and shape. The peak counter 68 is connected by a conductor 69 to the decimal converter 60 and the peak number is also transferred by the decimal converter 60 in the decimal format for operation of the solenoid driver 62 to imprint the identification number adjacent the total on operation of the printer 63. However, the device of this invention is not limited to the counting of only ten or less peaks by the peak counter 68, for the counter 68 may be allowed to operate through a decade to identify the peaks and, if desired, a tens digit may be added to the peak identification numbers printed by the printer 63.

The logic circuitry 53, while operating in response to the count enable signal from the peak recognition circuit 48, has additional inputs for handling wave form peaks which are non-Gaussian. For instance, a voltage wave form resembling the curve shown in FIG. 9 is divided by operation of the means indicated at the positive re-entry circuit 72. This wave form commonly occurs when a small peak precedes a larger peak with the peaks being sufficiently crowded together that the instantaneous value of the wave form between the peaks has positive and zero slope. The peak recognition means which recognizes sequentially slopes of zero, positive, zero, negative, and zerodiscards the intermediate occurrence of an additional zero slope followe by an additional positive slope an treats the wave form shown in FIG. 9 or 10 as one peak and operates the data counter 28 to obtain one area. However, the positive re-entry means 72 recognizes the occurrence of two consecutive positive slopes interrupted by a period of zero slope and operates the logic control circuitry 53 to divide the wave form into two areas. This is achieved by clearing the data counter 28 and transferring the information into the memory 57 and returning the data counter to zero at the proper time. The data counter 28 thereafter continues to accumulate the total of the larger portion of the peak simultaneous to the transfer of the smaller preceding peak from the memory 57 to the printer 63. This transfer occurs in the previously described fashion and the printer 63 prints out the area of the forwardmost peak along with a peak number from the peak counter 68 which is also printed out by the printer 63 for identification purposes. The second peak of the wave form shown in FIGS. 9 and 10 is handled in conventional manner with operation of the data counter 28 being halted upon the termination of the second peak by termination of the count enable signal from the peak recognition circuit 48 which operates through the logic circuitry 53 in the described manner.

On occasion, the amino acid analyser 10 outputs a wave form which, after logarithmic conversion, resembles the peak shown in FIGS. 11 and 12. Such an extensive plateau preceding the onset of the peak might occur, for instance, when the color absorbance of the effluent flowing past the photocell in the analyser 10 is increased and remains increased thereafter while not related to indication of unknown amino acids. This is seen and detected by the differentiating means of capacitor 36 and resistor 37 which acts on the positive slope of the plateau to provide a count enable signal from the peak recognition means 48. A plateau timer 74 co-operates with the logic control circuitry 53 by timing the span of zero slope indicative of a plateau to reset the data counter 28 to zero with the data being transferred from the counter 28 so as to not print out information at the printer 63. This, in effect, removes from the total registered by the counter 28 the area beneath the plateau and permits integration of the peak only as indicated in FIG. 11. On the other hand, the plateau timer 74 may be switched off to integrate the entire area under the curve as shown in FIG. 12.

The conductor 27 is connected from the V-to-F converter 26 to a threshold level detector 75 which operates on the pulse rate of the converter 26 to determine if the signal level returns to the base line value which is represented by perhaps three or four pulses per second. The threshold level detector 75 is set at a pulse rate somewhat higher than base line to define peaks characterized by the wave forms shown in FIGS. 13 and 14. Such peaks may may occur when a smaller peak occurs immediately after a larger peak resulting in zero slope on the backside of the wave form which backside is uninterrupted by any positive going signal. This represents two peaks which are run together but the threshold level detector 75 provides means for obtaining separate areas for the two peaks.

The peak recognition means 48 provides an output signal which terminates the count enable signal on the occurrence of the sequence of negative to zero slope but operation of logic 53 is supplemented or extended by operation of the threshold level detector means 75 when the slope sequence is negative to zero to negative. The means 75 immediately operates the logic 53 to enable operation of the data counter 28. The count total in the data counter 28 is transferred to the memory 57 and the counter 28 is cleared for immediate reoperation to accumulate the count total for the smaller, second peak. The total area of both peaks is transferred from the data counter 28 to the printer 63 in the previously described manner.

A minimum peak width timer 76 operates through the logic 53 to prevent print out of the total area under peaks which are excessively narrow and which cannot represent analytical information. The peak recognition means 48 operates in the routine manner to detect the onset of a very narrow peak with the count enable signal operating through the logic circuitry to obtain the total area registered in the data counter 28. When the width of the peak is below the minimum set on the peak timer 76, the data which is transferred and removed from the data counter 28 is not printed out to avoid assigning area totals to peaks which are believed to be spurious signals not representing analytical data. This is particularly useful in avoiding the recording of areas under excessively large noise bursts or the like which are so large that the automatic base line drift corrector circuit means 12 treats the noise bursts as analytical information.

Each of the means 72, 74, 75 and 76 adjusts operation of the control circuitry 15 of this invention which is tailored to voltage wave forms of various descriptions which are encountered over a widely divergent range of voltage sources. And, various chromatographs also provide voltage wave forms which extend over a wide range of amplitudes and shapes so that optimum operation of the integrating means of this invention may be obtained by slight adjustment of the adjustable means in the control means 15.

Those skilled in the art will recognize the circuitry designated in various blocks of FIG. 1 without further elaboration and are able to construct same in accordance with the teachings of this invention. Additionally, that portion of the block diagram schematic comprising the automatic base line drift compensating means 12 is described in copending patent application Ser. No. 361,970 now issued as United States Letters Patent No. 3,359,410. Of the the remaining circuit elements, additional information and description of the converter means 13, control means 15 and data handling means 16 will be disclosed to further amplify and define the present invention.

Figure 2:
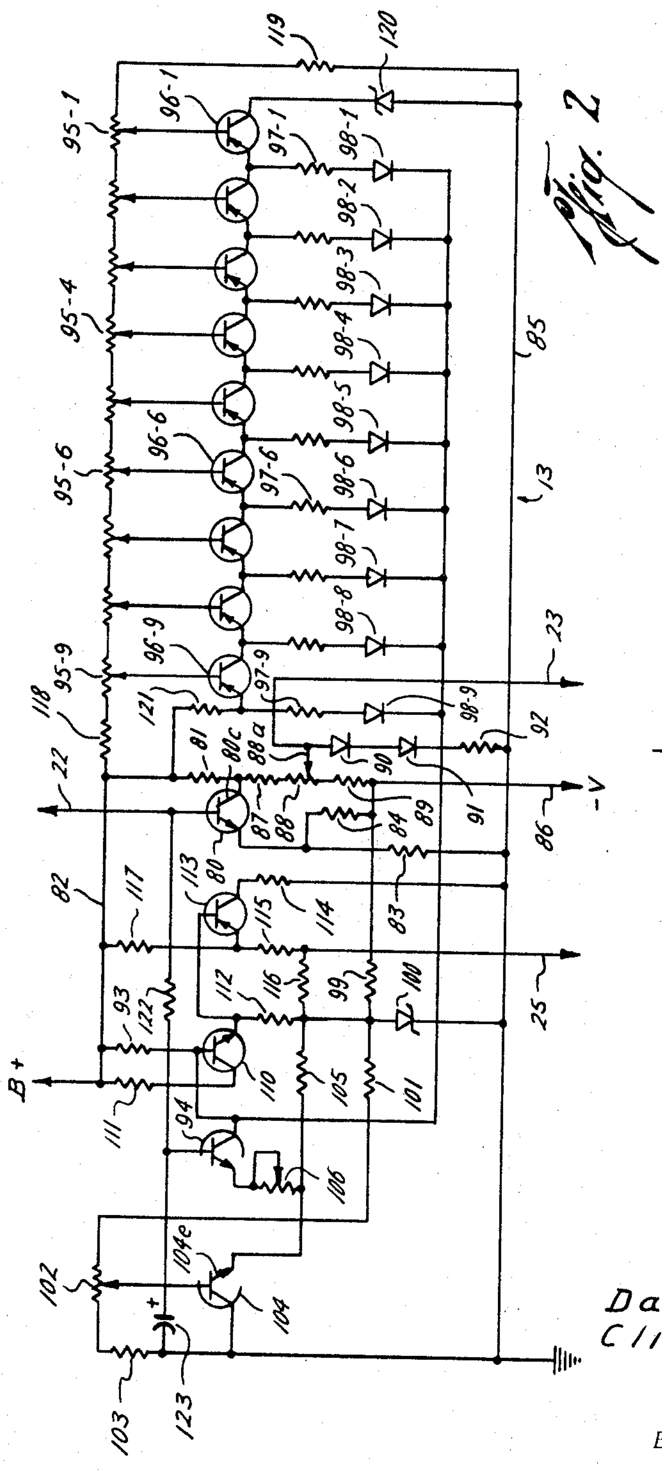
FIG. 2 is a schematic wiring diagram of a logarithmic converter for obtaining a linear voltage signal for integration.
Figure 3:
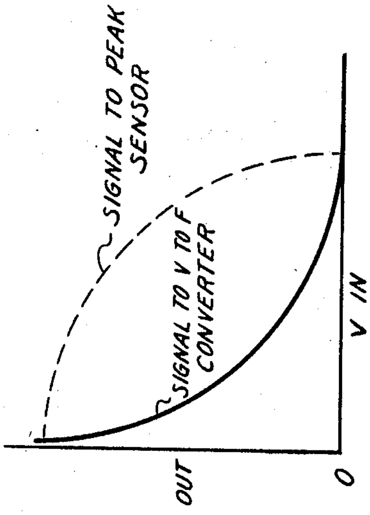
FIG. 3 is a graph showing the relationship of input voltage to output voltages of the logarithmic converter shown in FIG. 2.

Attention is first directed to the logarithmic converter 13 as illustrated in FIG. 2 which provides the output to input voltage relationship shown in the graph of FIG. 3. In FIG. 2, the amplified output of the amino acid analyser 10 is supplied by the conductor 22 as an input for a transistor 80 having its collector 80c connected to a load resistor 81 which communicates with a wire 82 for supplying B+ voltage. The transistor 80 has a pair of emitter resistors 83 and 84 with the resistors forming a voltage divider with the resistor 83 connected to a ground 85 and the resistor 84 connected to a negative voltage source such as the wire 86. The collector output is connected to the negative supply 86 by a series of resistors 87, 88 and 89 with the resistor 88 being tapped at **88*a* for providing an adjustable output voltage of the transistor 80 to the conductor 23 which connects with the slope detecting means shown in FIG. 1. The adjustable tap 88*a* also connects to a pair of diodes 90 and 91 in series with a resistor 92 connected to ground to provide dynamic loading means when the output voltage on the tap 88*a*** rises sufficiently above ground potential.

The input conductor 22 provides an input voltage which is maximum in a positive direction at its base line value so that the quiescent voltage on the transistor base maintains the transistor in a conducting state. The signal fluctuations representative of peaks indicating unknown amino acids from the analyser 10 swing in the negative direction from the quiescent voltage so that the signal voltage tends towards zero. As the signal voltage approaches zero, the NPN transistor 80 approaches cutoff which reduces the collector current and resultant voltage drop across the load resistor 81 and increases the voltage at the collector **80*c* of the transistor which is coupled to the series impedance including the resistors 87, 88 and 89. While the lower end of the series impedance is connected to a fixed voltage supplied by the conductor 86, variation at the upper end is proportionately coupled to the tap 88*a* which provides the output voltage for the conductor 23. The tap 88*a* is adjusted to provide a quiescent output voltage of zero for an input of maximum voltage, it being recalled that maximum input voltage in the positive direction represents the base line value of the signal from the analyser 10**.

The transistor 80 provides amplification of small deviations from the base line value to effectively expand the voltage variations indicating onset of a peak extending from the base line value. The amplification is decreased when the voltage at the tap **88*a* becomes sufficiently great to cause the diodes 90 and 91 to conduct forwardly through the resistor 92 to ground which places a nonlinear resistor in parallel with the output resistors of the transistor 80 to shape the curve as shown in FIG. 3. This, in effect, compresses the peaks which are large voltage fluctuations from the base line value supplied to the peak sensing means (including the slope sensing means and peak recognition means 48). Since the output of the peak recognition means 48** provides only an indication of the presence or absence of a peak, it is not material to operation of the peak sensing means whether or not the amplification of the large voltage fluctuations is nonlinear. Large fluctuations are compressed to obtain magnification of slight voltage deviations from the base line voltage value which increases the triggering accuracy and sensitivity of the peak sensing means.

The remainder of the transistorized circuitry shown in FIG. 2 co-operates to provide an output signal at the conductor 25 which has a relationship to the input signal shown by the concave curve in the graph of FIG. 3. The circuitry utilizes a plurality of small, straight line approximations to provide the output voltage which is inversely proportional to the antilogarithm of the input voltage. As a matter of fact, the circuit shown in FIG. 2 can approximate any essentially concave transformation even including points of discontinuity.

The input voltage supplied by the conductor 22 is amplified by a transistor 94 having a collector load resistor 93 and a plurality of adjustable parallel load resistors including an adjustable potentiometer, a transistor, a load resistor, and a diode. As the input voltage to the transistor 94 varies across the range of voltages indicative of base line value to full peak value from the analyser 10, the various straight line approximations are achieved by permitting conduction for each of the plurality of load circuits which, in the preferred embodiment, are nine circuits similar to the circuit consisting of the adjustable potentiometer 95–1, the transistor 96–1, the load resistor 97–1, and the diode 98–1. The nine circuits are indicated by the suffixes one through nine shown in FIG. 2.

The operating point of the transistor 94 is determined by voltages provided to the transistor 94 which voltage is fixed at a lower limit by a resistor 99 communicating from the negative voltage supply at the wire 86 to a Zener diode 100 for maintaining a constant voltage drop across the diode 100 which is connected to ground. The voltage provided at the anode of the diode 100 is applied to a series voltage divider including a resistor 101, a resistor 102, and a resistor 103, which is connected to ground. The resistor 102 is adjustable to set a base voltage for a transistor 104 which has a grounded collector and emitter 104*e* connected by a resistor 105 to the Zener diode 100. The transistor 104 operation is adjusted by the adjustable resistor 102 to provide a reference voltage at the emitter 104*e* which is connected to the transistor 94 by means of an adjustable emitter resistor 106. By these means, an adjustable reference voltage is provided for the transistor 94 which, with its collector circuitry, provides the logarithmic conversion output for the conductor 25.

The input voltage which is provided through a resistor 122 having a capacitor 123 connected to ground is amplified by the transistor 94 which essentially provides the output voltage at its collector, there being a current amplifier interposed between the transistor 94 and the output conductor 25. Zero adjustment to provide no output voltage for maximum input voltage (base line value) is obtained by adjustment of the reference voltage circuitry including the adjustable resistor 102. The input voltage supplied by the analyser 10 is inverted by the transistor 94 to make the base line value approximately zero with peaks above the base line represented by positive voltage swings. The output voltage is current amplified by a transistor 110 which is directly coupled to the transistor 94. The transistor 110 has a collector resistor 111 and has an emitter resistor 112 which is connected to the voltage fixed by the Zener diode 100 to obtain a fixed voltage point for the emitter. The transistor 110 is an emitter follower directly connected to an additional emitter follower 113. The transistor 113 has a collector resistor 114 connected to ground and obtains positive voltage for the emitter through a series of resistors 115, 116, and 117 which are tied to the fixed voltage supplied by the Zener diode 100 and the positive supply at the wire 82. The output conductor 25 is connected to the resistor 115 and 116 which co-operate as a voltage divider which provides a proper output voltage.

The group of circuits shown in FIG. 2 for providing variable loads on the collector of the transistor 94 are connected to a pair of resistors 118 and 119 which co-operate with the potentiometers 95–1 through 95–9 to control the end points of the voltage divider which connects from the conductor 82 to ground wire 85. The stacked transistors 96–1 through 96–9 are provided with a minimum voltage by the Zener diode 120 connected to the transistor 96–1 and with a high voltage provided by a resistor 121 which communicates with positive voltage source 82 and provides emitter current for the transistor 96–9.

In operation, the logarithmic conversion of the converter 13 is controlled by adjusting various voltages to shape the curve as shown in the graph of FIG. 3. For high gain transistors, the gain is given roughly by the ratio of the effective collector resistance to the emitter resistance from which it will be recognized that the adjustable emitter resistor 106 controls the gain of the circuit. The gain of the transistor 94 is altered by the action of the plurality of circuits included in the collector circuit which are switched on at various voltage points dependent on the input signal and the resulting collector voltage. For instance, the maximum input voltage which represents base line value of the output of the analyser 10 allows a large current to flow through the collector circuit of the transistor 94 which drops the collector voltage sufficiently that all of the diodes 98–1 through 98–9 are allowed to conduct. This places additional resistances in parallel with the resistor 93 so that the effective collector resistance is quite small. This reduces gain of the circuit as shown by the graph of FIG. 3 where large fluctuations near the base line value provide small fluctuations in voltage output.

By way of contrast, an input voltage of zero volts (maximum indication from the analyser 10) tends to cut off the transistor 94 and forces the collector voltage towards the voltage of the conductor 82 with a very small collector current flowing through the resistor 93. The high collector voltage blocks each of the diodes 98–1 through 98–9 which effectively increases the collector resistance to provide increased gain on achieving a larger ratio between the collector resistance and the emitter resistance. This is reflected in FIG. 3 by the large output voltage fluctuations obtained from the converter means 13 for a small change in input voltage to accomplish the logarithmic conversion. As the collector voltage of the transistor 94 decreases, the diodes 98 are unblocked one by one to alter the effective collector load and decrease the gain of the transistor 94. The voltage divider extending from the resistor 118 and including the resistors 95 provides the highest voltage at the anode of the diode 98–9 so that the resistor 97–9 is first added as the collector voltage of the transistor 94 decreases. This is repeated as the collector voltage decreases further as other collector loading circuits are added with the addition of each load altering the gain of the stage and providing a straight line segment for the approximation of the input-output relationship shown in the graph of FIG. 3. The straight line segments may be adjusted at their end points by adjusting the potentiometers 95–1 through 95–9 which comprise the voltage divider.

Figure 4:
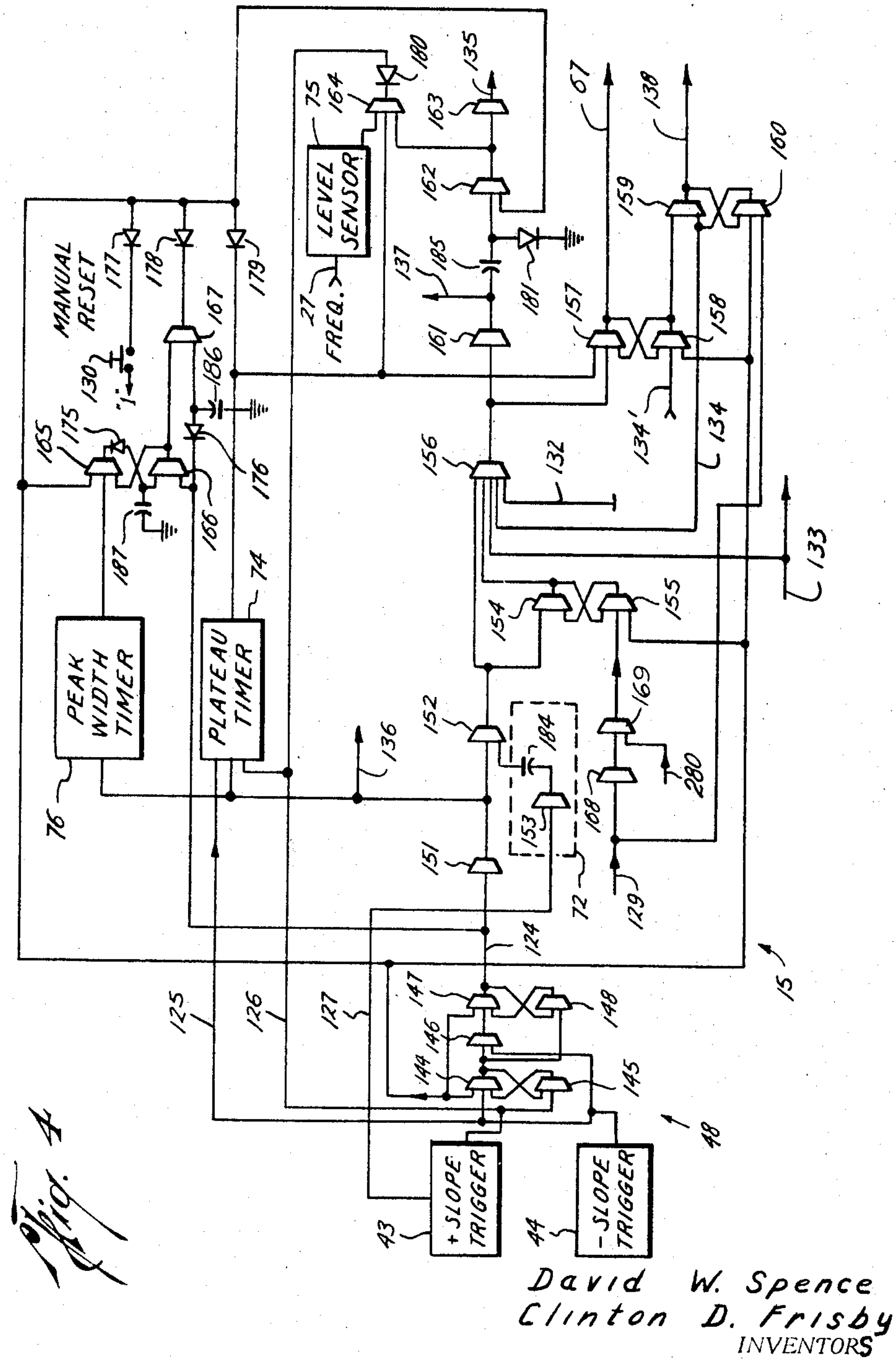
FIG. 4 is a schematic diagram of control logic for the integrator of this invention.

Attention is directed to FIG. 4 which illustrates the control logic 15 of this invention. For additional clarity, FIG. 4 includes the Schmitt triggers 43 and 44 and the NOR gates comprising the peak recognition means 48 which provides the peak indicating signal over a conductor 124 for the control means indicated generally at 15. The peak recognition means and Schmitt triggers co-operate to provide the peak signal in the conductor 124 in addition to a negative slope signal in a conductor 125, positive slope in a conductor 126, and not positive slope in a conductor 127. There is additionally included a manual reset switch 130 for the circuitry which provides a voltage level representing a logical "one" for operation of the logic elements of the control circuitry 15 which level (because of the use of PNP transistors) is a negative voltage below ground level. Ground level represents the "zero" binary level for operation of the logical circuitry.

The control logic 15 has additional inputs at the two conductors 129 and 280 which provide scanner off and multivibrator output signals, respectively, to indicate operation of the scanner means 64, and two inputs on the conductors 132 and 133 (print command and printer in operation signals) which communicate with the printer 63.

The control logic output signals or levels carried over the conductors shown including the wire 136 which provides a data counter input inhibit signal, a wire 137 which provides a memory input inhibit signal, and the wire 135 which provides the data counter reset signal. In addition, another output is the peak number counter conductor 67 and the conductor 138 which carries a scanner inhibit signal which will be described in greater detail as will the other outputs of the means 15.

The circuitry shown in FIG. 4 is comprised mostly of NOR gates with the peak recognition circuit 48 including NOR gates 144 through 148, inclusive, while the control logic circuitry 53 includes NOR gates 151 through 169, inclusive. The NOR gates of the control logic are provided with illustrated interconnections including diodes 175 through 181, inclusive, and capacitors 184 through 187, inclusive. The NOR gates respond to their input signals which are logical zeros or ones in the customary manner as will be understood by those skilled in the art. The circuitry 15 responds to the various inputs to provide the output signals for controlling the other circuits of the integrating means of this invention.

Figure 5:
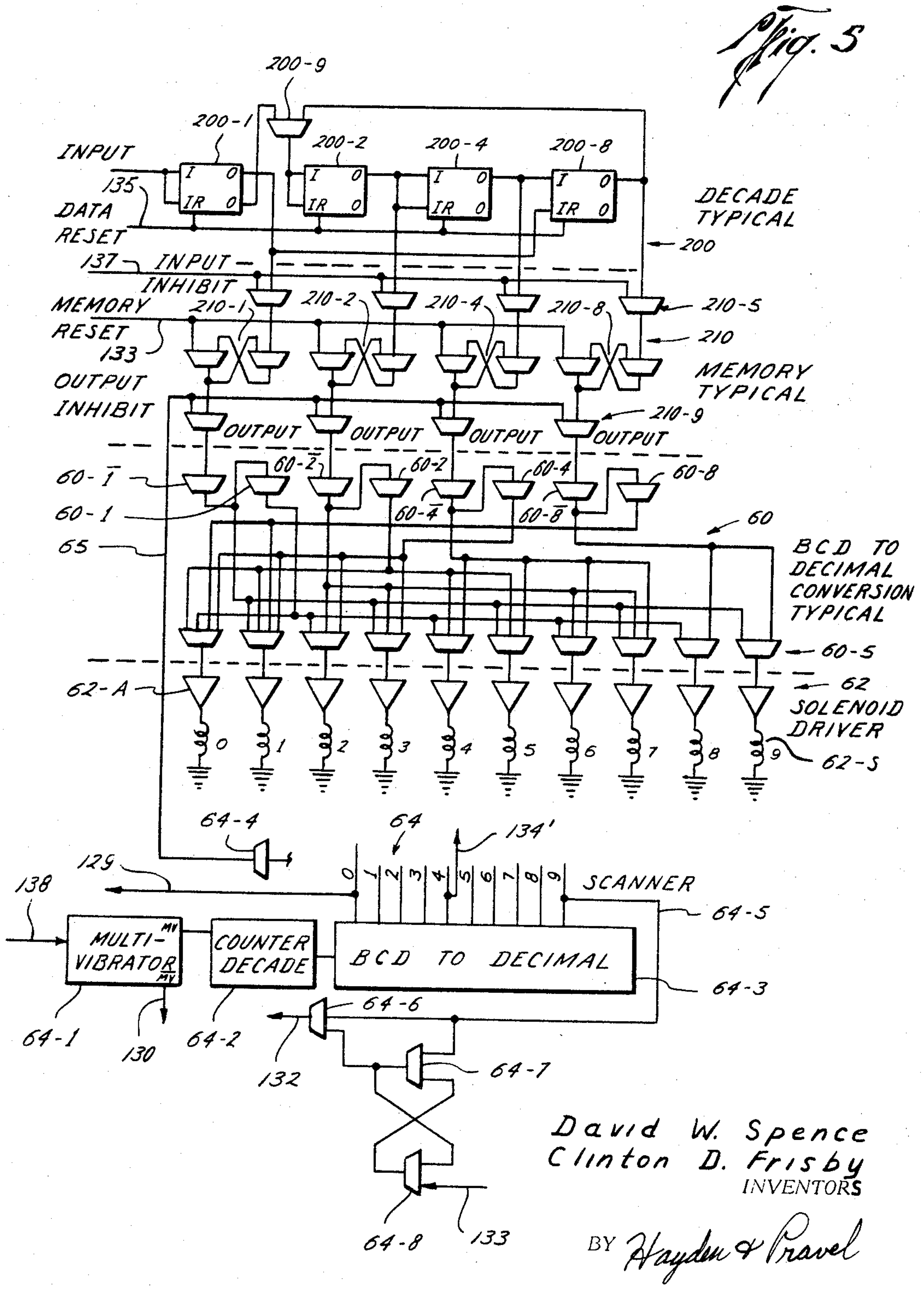
FIG. 5 is a schematic wiring diagram of data handling circuitry of this invention.

Attention is directed to FIG. 5 which illustrates details of the data handling portion 16 of the invention. Relating the schematic of FIG. 5 to the block diagram schematic of FIG. 1, there is shown a typical decade 200, one of which may be found in the peak number counter 68 with between five and seven decade counters 200 comprising the data counter 28. Each decade 200 in the counter 28 is connected to a memory device indicated generally at 210 for storing one decimal digit indicated. The BCD to decimal conversion means 60 is connected to the decimal digit memory device 210 comprising the memory 57 and also to the peak number counter 68 (it has no memory since it will not change during data readout) with the data being converted from the four bit binary code to conventional decimal representation. The various decimal representations of information are transferred to the solenoid drivers 62 for operation of the printer 63. Overall operation of the various memory decades 210 is controlled by the scanner means indicated generally at 64 as will be described in greater detail hereinafter.

The decade 200 includes four serially connected flip-flops which are identified at 200–1, 200–2, 200–4 and 200–8. Interconnection is achieved to count to ten and recycle to zero by the NOR gate 200–9 which converts the four bit register into a decimal counting device. Operation of this device is believed implicit from the schematic in response to pulses supplied to the input of the 200–1 bit counter and results in the formation of an output signal on the four conductors communicating with the memory means 210.

The memory means 210 includes bistable elements 210–1, 210–2, 210–4 and 210–8 (comprised of two NOR gates latched together) which are communicated with the register elements in the decade 200. Since the decade 200 is constantly changing value while counting to keep up with the input impulses supplied to the decade, and the final count is the only information designed to be transferred into the memory 210, four NOR gates indicated generally at 210–5 are provided between the bistable storage elements of the memory 210 and the register elements 200 to inhibit information transfer on occurrence of an inhibit signal in the conductor 137. The printer 63 registers one digit at a time and to this end, only one digit of memory 210 is interrogated sequentially so that the outputs of the memory elements are controlled by means of a group of output inhibit gates indicated generally at 210–9 which, in the preferred embodiment, are NOR gates interposed between the bistable storage elements and the decimal converter 60 and are operated by the scanner 64.

The decimal converter indicated generally at 60 is connected to all of the decades 210 in the memory 57 and to the decade comprising the peak number counter 68 with all the inputs to the converter 60 connected to a plurality of NOR gates. Each of the memory decades is controlled by the scanner 64 to transfer on command through the output inhibit gates 210–9 the four bits comprising each digit which are received by a plurality of NOR gates which provide binary representation of the signal and also the inverse of each bit. The gates are indicated at 60–1, 60–2, 60–4, 60–8, 60–$\bar{1}$, 60–$\bar{2}$, 60–$\bar{4}$, and 60–$\bar{8}$. The binary signals representing the information input to the decimal converter 60 are supplied by a connective matrix to a plurality of NOR gates indicated at 60–5 which are appropriately connected to the matrix for accomplishing decimal conversion. Considering one of the decimal digit gates 60–5, the decimal zero gate is operated by supplying four binary zeros to its input which together switch the output to a logical one. In addition, it is an obvious requirement that all of the gates maintain zero output if any gate is energized. The number zero is obtained from the binary coded decimal representation if the four bits are all zero which would operate the outputs of the gates 60–1, 60–2, 60–4 and 60–8 to zero. The decimal zero gate 60–5 is connected to these four gates by the matrix to provide a one output at the decimal zero gate while zero outputs from the remainder of all of the gates 60–5 are achieved by virtue of the fact that only the decimal zero gate obtains inputs from the above mentioned four gates.

The solenoid driver 62 includes a group of current amplifiers 62–A connected to the decimal digit gates 60–5 which operate to flow current through a group of connected solenoids indicated schematically at 62–S. It will be appreciated that the solenoids 62–S are actually mounted on and above the ten keys of the adding machine included in the printer 63 whereby electrical actuation of any of the solenoids depresses the key therebeneath to punch in a digit.

The scanner which is indicated generally at 64 includes a multivibrator 64–1 which is rendered operative in response to removal of the scanner inhibit signal on the conductor 138 and provides a series of pulses for a counter 64–2. The counter 64–2 is connected to the multivibrator 64–1 which counter is similar or even identical to the decade 200 shown for the data counter 28. The counter 64–2 is connected directly to a converter 64–3 which responds to the binary coded signals from the counter 64–2 in a manner similar to the decimal converter 60 also shown in FIG. 5. The converter 64–3 has a serial sequence of outputs which are carried by the conductive means indicated at 65 to the memory 67 after passing through phase reversal means in the form of a NOR gate 64–4. Each of the serial outputs causes timed transfer of one binary coded decimal digit from the memory 57 or other gated data source as the data is scanned by the means 64. The combination of counter 64–2 and the converter 64–3 can supply any number of serial outputs for scanning, typically ten outputs, as shown in the drawings.

The nine output is connected by a conductor 64–5 to a NOR gate 64–6 co-operating with a latch including NOR gates 64–7 and 64–8 for generating a print command signal in the conductor 132. Also, the conductor 134′ is connected to one of the intermediate (1–8) outputs of the decimal converter 64–3 which is the four output in the preferred embodiment; however, the conductor 134′ may be connected to any of the outputs other than the zero or nine outputs. The decade counter 64–2 is connected to the decimal converter 64–3 without any inhibit gates or the like placed therebetween so that one of the outputs of the binary to decimal converter 64–3 is continuously activated. Thus, in the quiescent state, the decimal converter 64–3 dwells on the zero output to provide a continuous level which is supplied by the conductor 129 to the control means 15 to indicate that the scanner 64 is not in operation.

Figure 6:
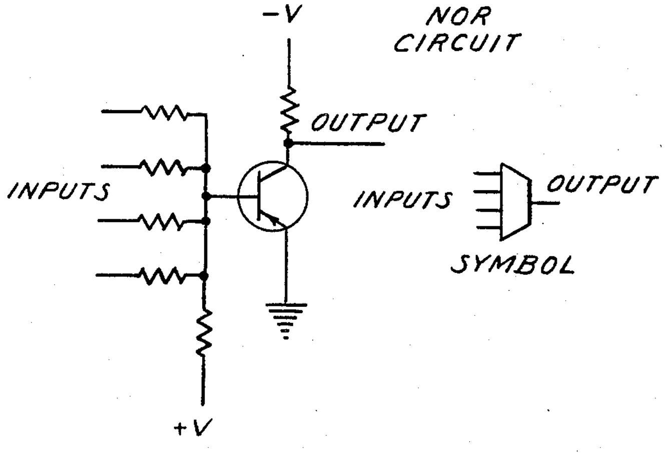
FIG. 6 is a schematic of a typical NOR gate.
Figure 7:
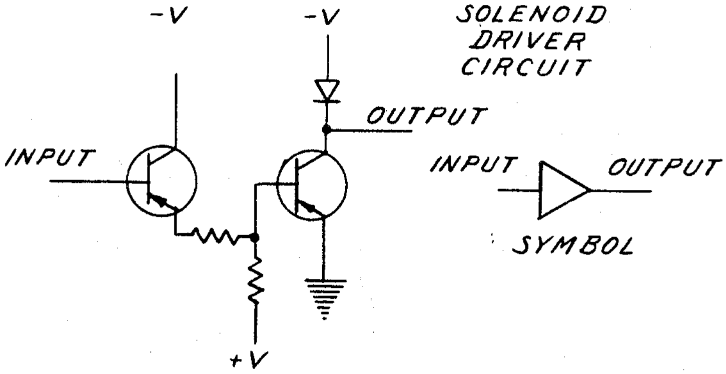
FIG. 7 is a schematic diagram of a typical solenoid driver circuit.
Figure 8:
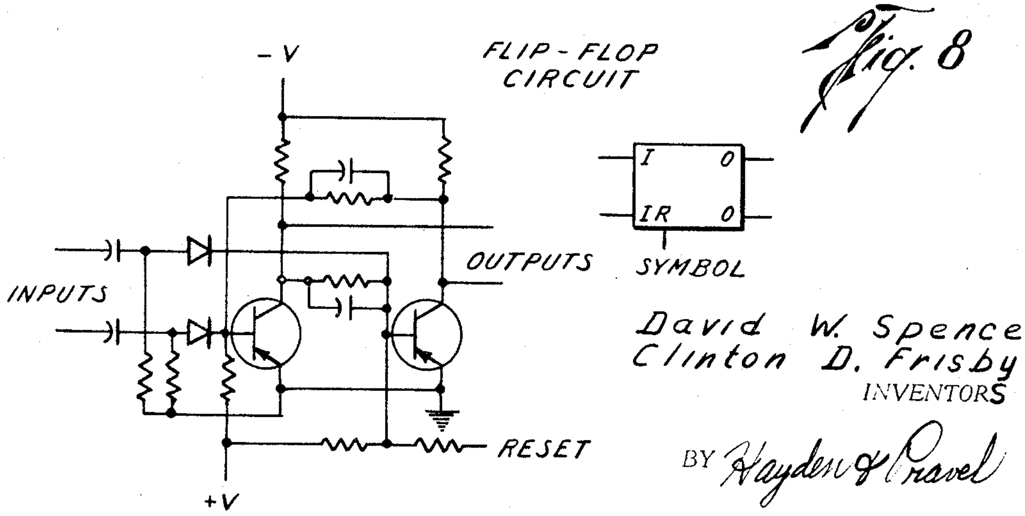
FIG. 8 is a schematic wiring diagram of a bistable flip-flop circuit.

FIGS. 6, 7, and 8 illustrate typical logical elements which are known to those skilled in the art and for which a detailed explanation is believed unnecessary.

In operation, the integrating and recording apparatus of the invention responds to signals in the following manner. Consider as a first example a wave form peak which may or may not be Gaussian in shape but which has only one peak as shown in FIGS. 15 and 16 and which is sufficiently wide to be more than a noise burst or other spurious indication. The log converter 13 operates in the previously described manner to provide a magnified or enlarged output to the conductor 23 which enables the slope detecting means connected thereto to determine more accurately the onset and termination of the wave form. The peak detecting means operates from the Schmitt triggers 43 and 44 output signals for generation of the peak indicating signal. The peak signal is transferred to the logic 53 which operates the remainder of the circuitry to count pulses provided by the V-to-F converter 26, it being recalled that each of the pulses provided by the converter 26 represents a unit portion of area under the peak in the wave form whereby the total count recorded in the data counter 28 is proportional to the peak area of the wave form of the stimulus acting on the amino acid analyser 10 after logarithmic conversion by the converter 13.

Attention is directed to FIG. 4 which shows the peak recognition means 48 connected to the means 15. The Schmitt triggers 43 and 44 provide signals to the logic 53 and peak recognition means 48 which are binary zero or binary one voltage levels.

Initial conditions of the logic 53 are achieved by operation of the switch 130 which is the manual reset which connects a binary one signal through the diode 177. As previously described, a binary one signal is a negative voltage while a binary zero signal is approximately zero volts. Resetting the apparatus provides a zero at the output terminals of gates 155, 158, 160, 162, 165, 147, and 152. The initial condition imposed by reset also maintains a binary one at the output of the gates 151, 154, 157, 159, and 161. Adidtionally, since the base line value has no slope, the positive slope Schmitt trigger 43 provides a binary one through the conductor 127 indicating not positive slope which places a zero on the output of the gate 153. Release of the manual reset switch 130 puts a zero on the reset conductors which does not change any of the elements with the exception of 162 and 163. A zero at the input of gate 162 causes a zero at the output of gate 164, and also causes a zero at the output 135 which is the data counter reset signal carried by the conductor 135 as shown in FIG. 5 to the bistable storage elements 200–1, 200–2, 200–4, and 200–8 in the typical decade 200. Of course, it may be appreciated that the signal in the conductor 135 is provided to all the decades in the data counter 28 whereby removal of the reset signal readies the counter 28 to accept pulses and total same.

The onset of a peak yields a binary one on the conductors 124 and 126 and places a zero on the conductor 127. These changes are the result of operation of the Schmitt triggers and peak recognition means 48. The conductor 126, being only one of the three inputs to the plateau timer 74, continues withholding of action of the timer 74. The output of the gate 151 becomes a zero (or ground potential) which is supplied by the conductor 136 as a data counter input inhibit signal communicated to the gate 28a (a NOR gate) which reacts to the zero input on the conductor 136 to relate its output to the pulses supplied from the converter 126, thus making the counter 28 uninhibited. The other inputs resulting from peak onset cause reversal of the gates 152, 153, and 155.

Upon achieving maximum value of the peak wave form such as that wave form shown in FIGS. 15 and 16, the slope goes to zero and the following changes occur. The positive slope signal to the conductor 126 becomes a logical zero. This causes all plateau timer 74 inputs to be at zero which begins operation of the plateau timer. Also, the not positive signal in conductor 127 becomes a one which momentarily charges the condenser 184 to momentarily change one of the two inputs for the gate 152 which gate maintains its output.

It was assumed that the wave form shown in FIG. 15 had no plateau and was also sufficiently wide to meet the standard set by the peak width timer 76. Thus, the value of the slope becomes negative before the plateau timer 74 completes an operation. A signal on the negative slope conductor 125 resets and holds the plateau timer 74.

Since it was assumed that the peak width was greater than the time adjusted on the peak width timer 76, the timer 76 completes operation and reverses the state of the gate 165 but does not operate the gate 166.

In the wave form assumed, the negative slope carries the instantaneous value to base line value which has zero slope. At peak termination, the signals in conductors 124 and 125 reverse and become logical zeros. A zero at the input of gate 166 causes an output of binary one. Gates 165 and 167 are unaltered by this change. Termination of the peak signal in the conductor 124 places a logical one on the conductor 136 which is supplied to the NOR gate 28a shown in FIG. 1 which provides a continuous zero input to the data counter 28 to inhibit the counting of pulses which are associated with the base line value and are of no consequence to chromatographic analysis. The series connected gates 151, 152, 156, and 161 are all operated to reverse outputs. Zero output at the gate 161 is supplied by the memory input inhibit conductor 137 to the input inhibit gates 210–5 shown in FIG. 5 whereby a zero input to the NOR gates 210–5 permits the gates to accept and transfer logical signals from the decade 200 into the bistable storage elements of the typical binary coded decimal memory device 210. Switching of the gate 156 to a binary one at its output operates the gate 157 to provide a zero output on the conductor 67 which connects to the peak number counter 68 shown in FIG. 1, causing the counter 68 to advance. The gate 158 latches the gate 157 to maintain the binary zero on the conductor 67.

Since the above mentioned switching occurred at the end of a peak, it is appropriate and timely to include circuit operations for transfer of data in the data handling means 16. This is initiated by the input to the gate 158 of the output of the gate 157 (a binary zero) which supplies a binary one to the gate 159 which causes the output of that gate to be a binary zero which is supplied to the conductor 138 which inhibits operation of the scanner 64. The gate 159 is maintained with a binary zero output by operation of the gate 160 which is provided with three inputs which are all binary zeros to continue withholding the inhibit signal on the conductor 138. Output of gate 161 going to binary zero communicates by means of the conductor 137 to inhibit input of the memory 57, allowing the memory to assume to state of the counter 200. When the output of the gate 160 becomes a binary one and is communicated via the conductor 134 to the gate 156, making its output a binary zero, the output of gate 161 becomes a binary one restoring the inhibit input to the memory 57. This signal operates through the capacitor 185 to supply a short binary one to the input of gate 162; providing a zero output from the gate 162. The gate 163 inverts the signal of the gate 162 and supplies a pulse on the conductor 135 which resets the bistable register elements in the decade 200 shown in FIG. 5 to thereby reset the data counter 28 to zero count in preparation for further counting thereafter.

As mentioned above, the scanner inhibit signal in the conductor 138 is removed to permit operation of the multivibrator 64–1. The vibrator 64–1 begins generating pulses which are counted by the decade 64–2 and the instantaneous count in the decade 64–2 is provided at the ten outputs of the decimal converter 64–3. The output on each terminal of the decimal converter 64–3 is inverted by a NOR gate (typified by the gate 64–4) associated with each output and supplied through the conductor 65 to the output inhibit gate 210–9 associated with each decade 210 of memory 57. It is desired to normally inhibit operation of all decades in the memory which is achieved by applying a binary one on the conductor 65 to the inhibit gates 210–9 yielding zero output for all gates. The scanner 64 places a binary zero on the ten outputs which are inverted by the NOR gates typified at 64–4 and applied over the conductor typified at 65 to all the decades. Scanning is achieved by sequentially enabling the gates 210–9 decade by decade.

Initiation of operation of the multivibrator 64–1 by removing the scanner inhibit signal on the conductor 138 supplies a multivibrator output signal through the conductor 280 to the gate 169 shown on FIG. 4 which signal co-operates with the output of the decimal converter 64–3 when the converter shifts from a binary one at its zero output terminal (its quiescent condition) and places a binary one on the one output terminal. The zero at zero output terminal is supplied by the conductor 129 to the gate 168 and inverted by the gate 168 shown in FIG. 4 causing the gate 169 to operate on the last half cycle of multivibrator output wave form. The output of the gate 169 indicates to the control means 15 that the scanner 64 has started by applying a one signal to the gate 155. A zero output of gate 155 along with a zero output from the gate 152 causes the gate 154 output to become a one which is applied to the gate 156 and holds the zero output from that gate until the onset of another peak.

The scanner 64 continues operation until a binary one appears at one of the intermediate terminals (the four terminal) which signal is conducted to the gate 158. A one input to the gate 158 forces its output to a binary zero which is connected to the gate 157 and generates a one output from the gate 157. Gate 157 provides a binary one output which latches with the gate 158.

The scanner 64 continues operation until the nine output terminal achieves a binary one signal. Binary one at the terminal nine of the scanner 64–3 is applied to the input of gate 64–7, causing a zero output. The nine output is also applied to input of 64–6 causing its output to continue at zero. The output of gate 64–7, which is zero, is applied to the gate 64–8 and allows gate 64–8 output to become a binary one, latching with the gate 64–7. At the end of the nine output of the scanner 64, the output of the gate 64–6 is then allowed to become a binary one. The conductor 132 takes the pulse which originates with the gate 64–6 and supplies it to the printer 63 shown in FIG. 1 to operate the print key (by means of a solenoid or the like) to cause the printer 63 to imprint the data punched in by the solenoid driver 62 through conventional operation of the printer 63. A switch (not shown) is actuated to provide a signal output from the printer 63 on the conductor 133 signifying that the printer is in fact operating. This signal is applied through the conductor 133 to the gate to reverse operation of the latched gates 64–7 and 64–8 and removes the print command signal on the conductor 132. The signals on the conductors 132 and 133 which are applied to the input of the gate 156 hold its output at binary zero during the printout operation. Additionally, the conductor 133 is connected to the reset input of memory 57 and applies a memory reset signal when the printer operates to imprint.

The scanner 64 continues operation to return the binary one output signal to the zero output terminal after sweeping across all the outputs to the nine terminal. A binary one supplied to the zero output terminal is carried by the conductor 129 to the logic 53 shown in FIG. 4 and operates the gates 159 and 160 to provide the scanner inhibit signal on the conductor 138 which is returned to the multivibrator 64–1 (FIG. 5) for halting operation of the scanner means 64. When the printer imprint operation described above is completed, all gates and other circuit elements are returned to the initial condition obtained before the onset of the peak and leaves the apparatus prepared for reception of an additional wave form and recording of same.

The information of the peak has been accumulated and thereafter transferred and printed out but it should be noticed that the sequence of operation prepared the apparatus for reception of an immediately following peak even while the count total of the peak preceding had been obtained and was still in memory being transferred to printer 63.

It is possible for the integrating and recording apparatus of this invention to receive signals from the amino acid analyser 10 which do not have sufficient peak width to warrant recording of the area under the peak. This would result in the peak signal on the conductor 124 subsisting while the peak width timer 76 operates but expiring before the peak width timer 76 completes its operation and signals same. In that event, the change of the peak signal from the peak recognition means 48 to a binary zero on the conductor 124 is connected through the diode 176 and grounded capacitor 186 to the gate 167 which provides a binary one on the output of the gate 167 after a slight delay caused by the diode and the capacitor. The slight delay of the output of the gate 167 permits the termination of the peak signal on the conductor 124 to operate the gates 151, 152, 156, 161, 157, 158, and 159. This operation removes the scanner inhibit signal on the conductor 138 and permits the scanner 64 to begin operation. However, before scanner 64 changes from its initial or quiescent state, the operation of the gate 167 output to a binary one state causes the diode 178 to conduct the binary one (a negative voltage) to the reset circuitry which affects the gates 155, 158, 160, 162, and 165 directly, and returns all other gates to the reset condition while simultaneously returning the inhibit signal through the conductor 138 to stop operation of the scanner means 64. The only output signal of any consequence is the peak number signal carried by the conductor 67 which advances the peak number counter 68 by one without providing any data for that peak. This number is skipped in the print out because the scanner 64 is never operated to transfer the data to the printer 63 and operate same.

On occasion, the analyser 10 will provide a signal voltage representing a stimulus peak wave form such as that shown in FIGS. 9 and 10 which resembles a smaller peak so close to a larger, trailing peak that there is no negative slope between the two peaks. The entire length of the wave form shown in FIGS. 9 and 10 is sensed by the peak recognition means 48 and represented by a signal level on the conductor 124 coinciding with the duration of the peak. However, the positive slope re-entry means 72 interrupts in the logic 53 to effectively divide the peak signal on the conductor 124 into two separate portions so that the apparatus responds to two separate peaks. This is achieved in the following manner. The first portion of the peak is signalled by positive slope and then zero slope which operate the apparatus in the same manner as described hereinbefore. At all times during positive slope, the conductor 127 maintains ground (binary zero) as the input for the NOR gate 153. Zero slope yields a binary one on the conductor 127 and a binary zero output on the gate 153. As the instantaneous value of the signal becomes a positive going signal again, the binary zero on the conductor 127 operates the gate 153 output to binary one which is input to the gate 152 to change its output to zero, overriding the signal condition interposed by the gate 151 which responds to the peak signal conductor 124. From the gate 152 on, all circuitry responds as though the peak were ended and reacts as described hereinbefore to terminate the counting in the data counter 28, transfer the count to the memory 57, scan the memory through operation of the scanner 64 and print the data at the printer 63. A brief interruption, provided by operation of the positive slope re-entry means 72, ends after charging of the capacitor 184 and the output of the gate 151 is re-established at the gate 152 so that the circuitry connected thereto responds to the second part of the interrupted peak signal as it would to a new peak.

On occasion, the input from the analyser 10 (after logarithmic conversion) may resemble the wave form shown in FIGS. 11 and 12 which includes plateaus which do not represent meaningful information. The plateau timer 74 disposes of the area accumulated up to the beginning of the actual peak with the total being deleted from print out.

When the instantaneous value reaches the plateau, the peak recognition means 48 provides a peak signal in the conductor 124 which forms a binary zero at the output of gate 151. The negative and positive slope conductors 125 and 126 are also input to the plateau timer 74 so that the coincidence of three binary zero inputs to the plateau timer 74 starts operation of a timer. If the slope of the wave form is unaltered and the timer 74 completes operation, it outputs a binary one to the diode 179 which is connected to the manual reset circuitry and causes reset of all gates such as the gates 155, 158, 160, 162, and 165. The peak number counter 68 is advanced by operation of the gate 157 but the area accumulated is never printed out because the scanner 64 is not operated to print out the total accumulated by the data counter 28. The reset circuitry, being connected to the gates 144 and 147 in the peak recognition means, resets the output of the peak recognition circuit 48 on the conductor 124 to a zero level to prepare the means for onset of the remainder of the wave form. Examination of FIGS. 11 and 12 reveals that the remainder of the wave form operates the control means 15 in the conventional manner as described hereinbefore.

FIGS. 13 and 14 illustrate wave forms which are comprised of two peaks run together and which should be represented by two separate peak areas. This is achieved by the threshold level sensor 75 which provides an output signal of binary zero when the pulse rate provided by the conductor 27 exceeds a predetermined level. The sequence of zero slope, positive slope, zero slope, negative slope and zero slope (the plateau of the second peak) operates the peak recognition means 48 in the previously described manner as well as the logic circuitry 53 to terminate integration of the area under the forwardmost part of the peak and begin to transfer data to the printer 63. The zero output (with pulse frequency of input above preset level) from the level detector 75 is connected as an input to the NOR gate 164. As the series of gates extending from gate 151 to gate 162 are operated, as previously described, the resulting zero output of the gate 162 places all inputs of the gate 164 at a binary zero to form a binary one output. The binary one output of the gate 164 is coupled to the diode 180 to place a negative voltage on the conductor 126 which is connected into the peak recognition means 48. This serves as an artificial signal indicating positive slope to the peak recognition means (having been previously reset after completion of operation) whereby a new peak signal is provided at the output conductor 124 which restarts operation of the control logic 53 for accumulating the area under the second peak of the illustrated wave form to divide the wave form into separate peaks and to obtain the total area of each peak separate and apart from the other peak.

Certain alterations may be incorporated with the apparatus of this invention as will be understood by those skilled in the art. An example among these are the utilization of the various types of logic circuit elements, flipflops and the like. The logarithmic converter 13 is illustrated with nine loading circuits shown in the collector circuitry of the transistor 94 but it will be appreciated that the number of such circuits may be altered to generate any wave form desired with greater or fewer straight line segment approximations of the desired input-output relationship. The data handling means 16 illustrated in FIG. 5 provides typical circuits which may be duplicated to accumulate over any number of decades of decimal digits although such format is not necessarily required. The apparatus is shown as including a printer 63 and solenoid driver 62 but the solenoid driver 62 may be replaced by input circuitry for apparatus recording the data or other apparatus such as tape punch machines, magnetic drums, or the like. Visual read out indicators may be connected to the counter 28 to provide a visible display of data.

Various switches for actuating circuit elements and controlling parameters of the circuitry shown in the drawings may be included to provide extended range of operation of the device. As previously mentioned, a second decade may be placed with the peak number counter 68 for some additional benefit. Considering FIG. 4, the plateau timer 74, the frequency level sensor 75, and peak width timer 76 may all be provided with on-off switches in addition to adjustable settings to accommodate various conditions in using the equipment of this invention. However, such apparatus may be deleted along with the gates 153, 164, 165, 166, and 167 with the apparatus remaining capable of handling all wave forms without making any discrimination as to shape.

Broadly, this invention relates to a device for yielding an output nonlinearly related to the input where such output is linear. The invention distinguishes various wave forms input thereto and relates the output to the various wave forms.

What is claimed is:

1. An integrator adapted to receive variable analytical wave forms produced at the output of a transducer or other source for determining the area under the wave form wherein said area is representative of the magnitude of the stimulus at the input to the transducer comprising:

(a) analog to digital converter means for receiving said variable output wave form and for emitting pulses representing equal increments of area under the wave form;

(b) peak determining means for determining the presence or absence of a peak in such analytical output wave form;

(c) logic means for determining the occurrence of predetermined combinations of slope, amplitude and pulse width in said analytical wave form;

(d) an electronic counter means connected to said analog to digital converter means for counting the pulses received therefrom; and (e) control means connected with said peak determining means and said logic means for controlling operation of said counter means to thereby distinguish and obtain the pulse count for the total area only for those peaks of the analytical wave form having predetermined combinations of slope, amplitude and pulse width.

2. An integrator adapted to receive variable analytical wave forms from an amino acid analyzer or other source where information content of the wave form may be nonlinearly related to wave form amplitude comprising:

(a) converter circuit means for receiving the nonlinear analytical output wave form from the source and for providing a linearized output wave form having an amplitude which is linearly related to the magnitude of an unknown stimulus acting on the input to the source;

(b) analog to digital converter means for receiving the linearized output wave form of said first circuit means and for forming pulses representing equal increments of area under the linearized output wave form;

(c) peak determining means for determining the presence or absence of a peak in such analytical output wave form;

(d) an electronic counter means connected to said analog to digital converter means for counting the pulses received therefrom; and (e) control means connected with said peak determining means for controlling operation of said counter means to thereby distinguish and obtain the pulse count for the total area only for those peaks of the linearized output wave form having a fixed slope sequence, pulse width and amplitude.

3. An integrator adapted to receive variable analytical wave forms produced at the output of a transducer or other source for determining the area under the wave form wherein said area is representative of the magnitude of the stimulus at the input to the transducer comprising:

(a) analog to digital converter means for receiving said variable output wave form and for emitting pulses representing equal increments of area under the wave form;

(b) peak determining means for determining the presence or absence of a peak in such analytical output wave form;

(c) logic means for determining and separating plural peaks which run together in said analytical wave form and for indicating presence or absence of such plural peaks;

(d) an electronic counter means connected to said analog to digital converter means for counting the pulses received therefrom; and (e) control means connected with said peak determining means and said logic means for controlling operation of said counter means to thereby obtain the pulse count for a separate area for each of said plural peaks of the analytical wave form.

4. An integrator adapted to receive variable analytical wave forms produced at the output of a transducer or other source for determining the area under the wave form wherein said area is representative of the magnitude of the stimulus at the input to the transducer comprising:

(a) analog to digital converter means for receiving said variable output wave form and for emitting pulses representing equal increments of area under the wave form;
(b) peak determining means for determining the presence or absence of a peak in such analytical output wave form;
(c) logic means for determining and indicating a peak on a plateau in said analytical wave form;
(d) an electronic counter means connected to said analog to digital converter means for counting the pulses received therefrom; and
(e) control means connected with said peak determining means and said logic means for controlling operation of said counter means to thereby preserve the pulse count for the total area under the peak of the wave form and destroy the count related to the area under the plateau.

5. An integrator adapted to receive variable analytical wave forms produced at the output of a transducer or other source for determining the area under the wave form wherein said area is representative of the magnitude of the stimulus at the input to the transducer comprising:

(a) analog to digital converter means for receiving said variable output wave form and for emitting pulses representing equal increments of area under the wave form;
(b) peak determining means for determining the presence or absence of a peak in such analytical output wave form;
(c) logic means for determining the presence of two peaks run together in said wave form as indicated by the fact that the wave form has zero slope and a nonbase line value between the peaks and for indicating the presence of each peak separately;
(d) an electronic counter means connected to said analog to digital converter means for counting the pulses received therefrom; and
(e) control means connected with said peak determining means and said logic means for controlling operation of said counter means to thereby obtain a separate total area for each of said two peaks of the wave form.

6. An integrator adapted to receive variable analytical wave forms produced at the output of a transducer or other source for determining the area under the wave form wherein said area is representative of the magnitude of the stimulus at the input to the transducer comprising:

(a) analog to digital converter means for receiving said variable output wave form and for emitting pulses representing equal increments of area under the wave form;
(b) peak determining means for determining the presence or absence of a peak in such analytical output wave form;
(c) logic means for determining the presence of two peaks run together in said analytical wave form so that slope of the wave form is zero, positive, zero, positive, zero, negative, and zero, in that order, and for indicating the occurrence of each peak separately;
(d) an electronic counter means connected to said analog to digital converter means for counting the pulses received therefrom; and
(e) control means connected with said peak determining means and said logic means for controlling operation of said counter means to thereby obtain a separate total area for each of said two peaks of the wave form.

7. Integrating apparatus adapted to receive nonlinear variable analytical wave forms for determining the area under peaks in said nonlinear wave forms wherein said peaks extend from a base line value of the wave form comprising:

(a) converter circuit means for receiving the nonlinear variable wave form and providing a linearized output signal;
(b) peak determining means operable by the slope of the wave form of said output signal for indicating the presence of peaks in the wave form;
(c) analog to digital converter means for receiving the linearized output wave form of said first circuit means and for forming pulses representing equal increments of area under the linearized output wave form;
(d) counter means connected to said analog to digital converter means for totaling the pulses formed by said analog to digital converter means; and
(e) control means connected with said peak determining means for controlling operation of said counter means to thereby distinguish and obtain the total area only for those peaks of the linearized output wave form having a fixed slope sequence, pulse width, and amplitude.

8. The invention of claim 7 wherein said control means initiates operation of said counter means at the beginning of the peak and stops said counter means at the end of the peak.

9. The invention of claim 7 including memory means for receiving and storing the total count for each peak obtained by said counter means.

10. The invention of claim 9 including means for clearing said counting means after obtaining the total for one peak to permit said counter to total the area under a subsequent peak.

11. The invention of claim 7 including means for consecutively numbering peaks, and means for storing the peak numbers and total areas.

12. The invention of claim 7 including means for detecting peaks having a width below a predetermined minimum to prevent the totaling of areas of narrow pulse width peaks caused by noise.

13. The invention of claim 7 including means for providing a base line free of drift between peaks.

14. The invention of claim 7 including means for detecting plateaus on the base line, and means for preventing the totaling of areas of plateaus.

15. The invention of claim 7 including:

(a) means for receiving and storing the value of the total area under a peak; and
(b) means for adding the value of the areas of a plurality of peaks occurring in a wave form to obtain the total area of the wave form.

16. A system for automatically analyzing an amplitude modulated analytical voltage or current wave form having a nonlinear relationship with respect to the information content of such wave form comprising:

(a) slope sensing means for detecting positive and negative slopes and for detecting the onset and termination of an amplitude excursion in the amplitude modulated wave form;
(b) linearizing means for converting the amplitude modulated wave form into a second and linearized amplitude modulated analytical wave form having a linear relationship between information content and wave form amplitude;
(c) converting means for converting the linearized amplitude modulated analytical wave form into a frequency modulated pulse train;
(d) counting means for counting the pulses occurring in said pulse train during the interval between the onset and termination of an amplitude excursion in the amplitude modulated signal;
(e) control means coupled to the slope sensing means and responsive to the occurrence of a point of zero slope intermediate the occurrence of non-zero slopes for controlling the operation of said counting means for separately totaling the numbers of pulses during said counting interval occurring before and after the occurrence of said point of zero slope; and
(f) recording means for recording the separate totals provided by said counting means.

17. A system for automatically analyzing an amplitude modulated analytical voltage or current wave form comprising:
(a) peak sensing means for detecting the onset and termination of an amplitude excursion in the amplitude modulated wave form;
(b) converting means for converting the amplitude modulated analytical wave form into a frequency modulated pulse train;
(c) counting means for counting the total number of pulses occurring in said pulse train during the interval between the onset and termination of an amplitude excursion in the amplitude modulated signal;
(d) recording means for preserving the total count of said counting means;
(e) positive re-entry means for detecting the occurrence of the sequence of positive, zero, and positive slope in the amplitude modulated analytical wave form; and
(f) first separating means for separating the wave form having said sequence of positive, zero, and positive slope into two separate areas to produce two separate counts in said counting means.

18. A system for automatically analyzing an amplitude modulated analytical voltage or current wave form comprising:
(a) peak sensing means for detecting the onset and termination of an amplitude excursion in the amplitude modulated wave form;
(b) converting means for converting the amplitude modulated analytical wave form into a frequency modulated pulse train;
(c) counting means for counting the total number of pulses occurring in said pulse train during the interval between the onset and termination of an amplitude excursion in the amplitude modulated signal;
(d) recording means for preserving the total count of said counting means;
(e) threshold level detector means for detecting the occurrence of the sequence of negative and zero slope in the amplitude modulated analytical wave form with the amplitude of the wave form during said last named zero slope being above a predetermined maximum value; and
(f) second separating means for separating the wave form having said sequence of negative and zero slope into two separate areas to produce two separate counts in said counting means.

19. A system for automatically analyzing an amplitude modulated analytical voltage or current wave form comprising:
(a) peak sensing means for detecting the onset and termination of an amplitude excursion in the amplitude modulated wave form;
(b) converting means for converting the amplitude modulated analytical wave form into a frequency modulated pulse train;
(c) counting means for counting the total number of pulses occurring in said pulse train during the interval between the onset and termination of an amplitude excursion in the amplitude modulated signal;
(d) recording means for preserving the total count of said counting means;

(e) plateau timer means for detecting the sequence of positive slope followed by zero slope in the amplitude modulated analytical wave form wherein said last named zero slope continues beyond a predetermined maximum period of time;
(f) inhibiting means for preventing said recording means from preserving the count from said counter means accumulated during the presence of said last named zero slope; and
(g) resetting means for resetting said counter means to zero count upon detecting said last named sequence.

20. A system for automatically analyzing an amplitude modulated analytical voltage or current wave form comprising:
(a) peak sensing means for detecting the onset and termination of an amplitude excursion in the amplitude modulated wave form;
(b) converting means for converting the amplitude modulated analytical wave form into a frequency modulated pulse train;
(c) counting means for counting the total number of pulses occurring in said pulse train during the interval between the onset and termination of an amplitude excursion in the amplitude modulated signal;
(d) recording means for preserving the total count of said counting means; and
(e) minimum peak timer means for preventing said recording means from preserving the count from said counter means accumulated when the interval between peak onset and peak termination is less than a predetermined minimum period of time.

21. A system for automatically analyzing an amplitude modulated analytical voltage or current wave form comprising:
(a) peak sensing means for detecting the onset and termination of an amplitude excursion in the amplitude modulated wave form;
(b) converting means for converting the amplitude modulated analytical wave form into a frequency modulated pulse train;
(c) counting means for counting the total number of pulses occurring in said pulse train during the interval between the onset and termination of an amplitude excursion in the amplitude modulated signal;
(d) recording means for preserving the total count of said counting means;
(e) positive re-entry means for detecting the occurrence of the sequence of positive, zero, and positive slope in the amplitude modulated analytical wave form;
(f) first separating means for separating the wave form having said sequence of positive, zero, and positive slope into two separate areas to produce two separate counts in said counting means;
(g) threshold level detector means for detecting the occurrence of the sequence of negative and zero slope in the amplitude modulated analytical wave form with the amplitude of the wave form during said last named zero slope being above a predetermined maximum value;
(h) second separating means for separating the wave form having said sequence of negative and zero slope into two separate areas to produce two separate counts in said counting means;
(i) plateau timer means for detecting the sequence of positive slope followed by zero slope in the amplitude modulated analytical wave form wherein said last named zero slope continues beyond a predetermined maximum period of time;
(j) inhibiting means for preventing said recording means from preserving the count from said counter means accumulated during the presence of said last named zero slope;
(k) resetting means for resetting said counter means to zero count upon detecting said last named sequence; and (l) minimum peak timer means for preventing said recording means from preserving the count from said counter means accumulated when the interval between peak onset and peak termination is less than a predetermined minimum period of time.

22. The system of claim 16 including:

(g) means for automatically correcting the base line value of the amplitude modulated analytical wave form in the absence of an amplitude excursion in the wave form above a predetermined value; and (h) memory means for temporarily storing the count totals of said counting means while they are being transferred to said recording means.

23. The system of claim 17 including:

(g) means for automatically correcting the base line value of the amplitude modulated analytical wave form in the absence of an amplitude excursion in the wave form above a predetermined maximum value; and (h) memory means for temporarily storing the count total of said counting means while it is being transferred to said recording means.

24. The system of claim 18 including:

(g) means for automatically correcting the base line value of the amplitude modulated analytical wave form in the absence of an amplitude excursion in the wave form above a predetermined maximum value; and (h) memory means for temporarily storing the count total of said counting means while it is being transferred to said recording means.

25. The system of claim 19 including:

(h) means for automatically correcting the base line value of the amplitude modulated analytical wave form in the absence of an amplitude excursion in the wave form above a predetermined maximum value; and (i) memory means for temporarily storing the count total of said counting means while it is being transferred to said recording means.

26. The system of claim 20 including:

(f) means for automatically correcting the base line value of the amplitude modulated analytical wave form in the absence of an amplitude excursion in the wave form above a predetermined maximum value; and (g) memory means for temporarily storing the count total of said counting means while it is being transferred to said recording means.

27. The system of claim 21 including:

(m) means for automatically correcting the base line value of the amplitude modulated analytical wave form in the absence of an amplitude excursion in the wave form above a predetermined maximum value; and (n) memory means for temporarily storing the count total of said counting means while it is being transferred to said recording means.

References Cited

UNITED STATES PATENTS

| | | | |
|---|---|---|---|
| 2,960,910 | 11/1960 | Pelavin | 250—218 X |
| 3,185,820 | 5/1965 | Williams et al. | 235—92 |
| 3,197,627 | 7/1965 | Lewis | 235—197 X |
| 3,230,358 | 1/1966 | Davis et al. | 235—183 |
| 3,333,090 | 7/1967 | Neer | 235—183 X |

MALCOLM A. MORRISON, *Primary Examiner.*

F. D. GRUBER, *Assistant Examiner.*